May 23, 1944.   C. H. DOLAN, 2D   2,349,540
AUTOMATIC FEEDER
Filed June 28, 1943   4 Sheets-Sheet 2
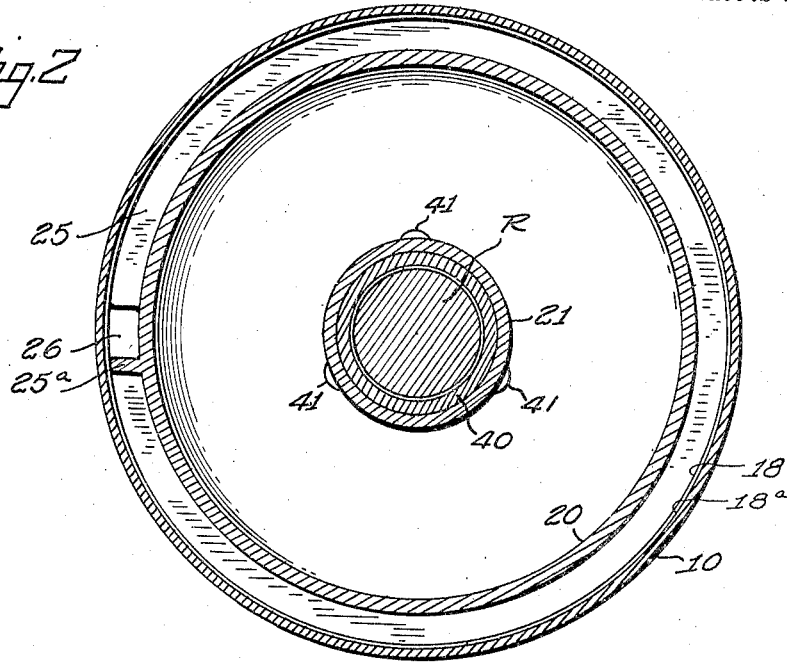
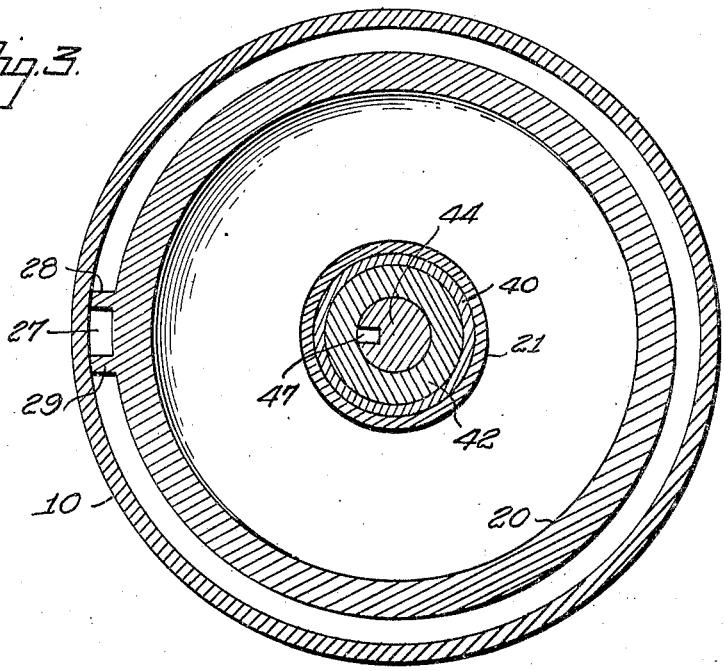
INVENTOR.
CHARLES H. DOLAN II
BY Miller & Miller
attorneys May 23, 1944.  C. H. DOLAN, 2D  2,349,540
AUTOMATIC FEEDER
Filed June 28, 1943  4 Sheets-Sheet 3
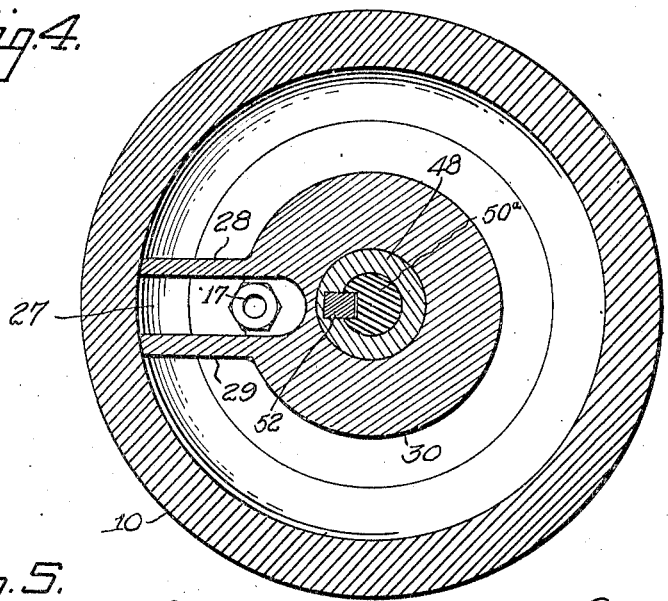
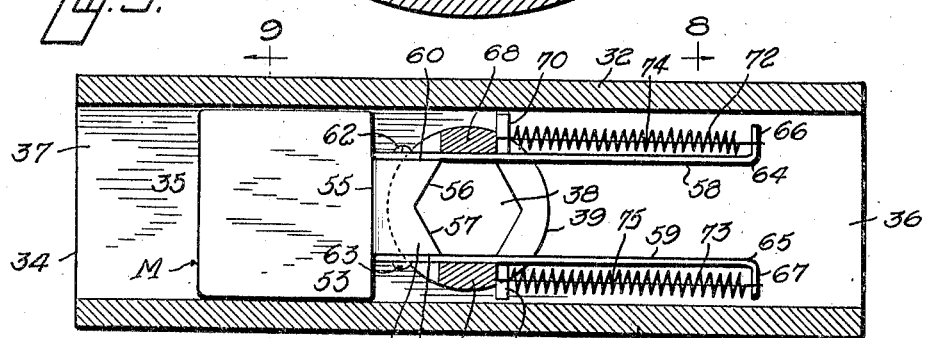
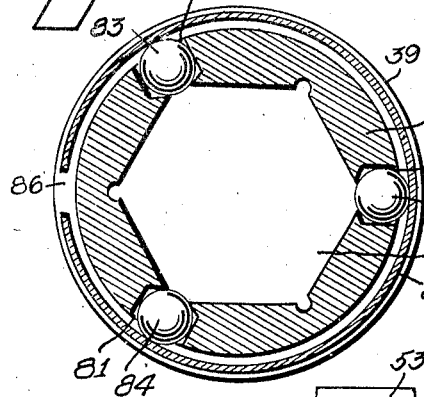
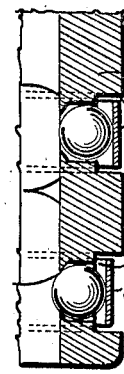
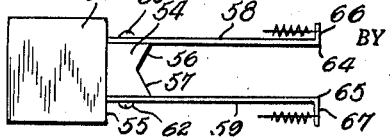
INVENTOR.
CHARLES H. DOLAN II
BY
Miller & Miller
attorneys Inventor
CHARLES H. DOLAN II
By Miller & Miller
Attorneys Patented May 23, 1944

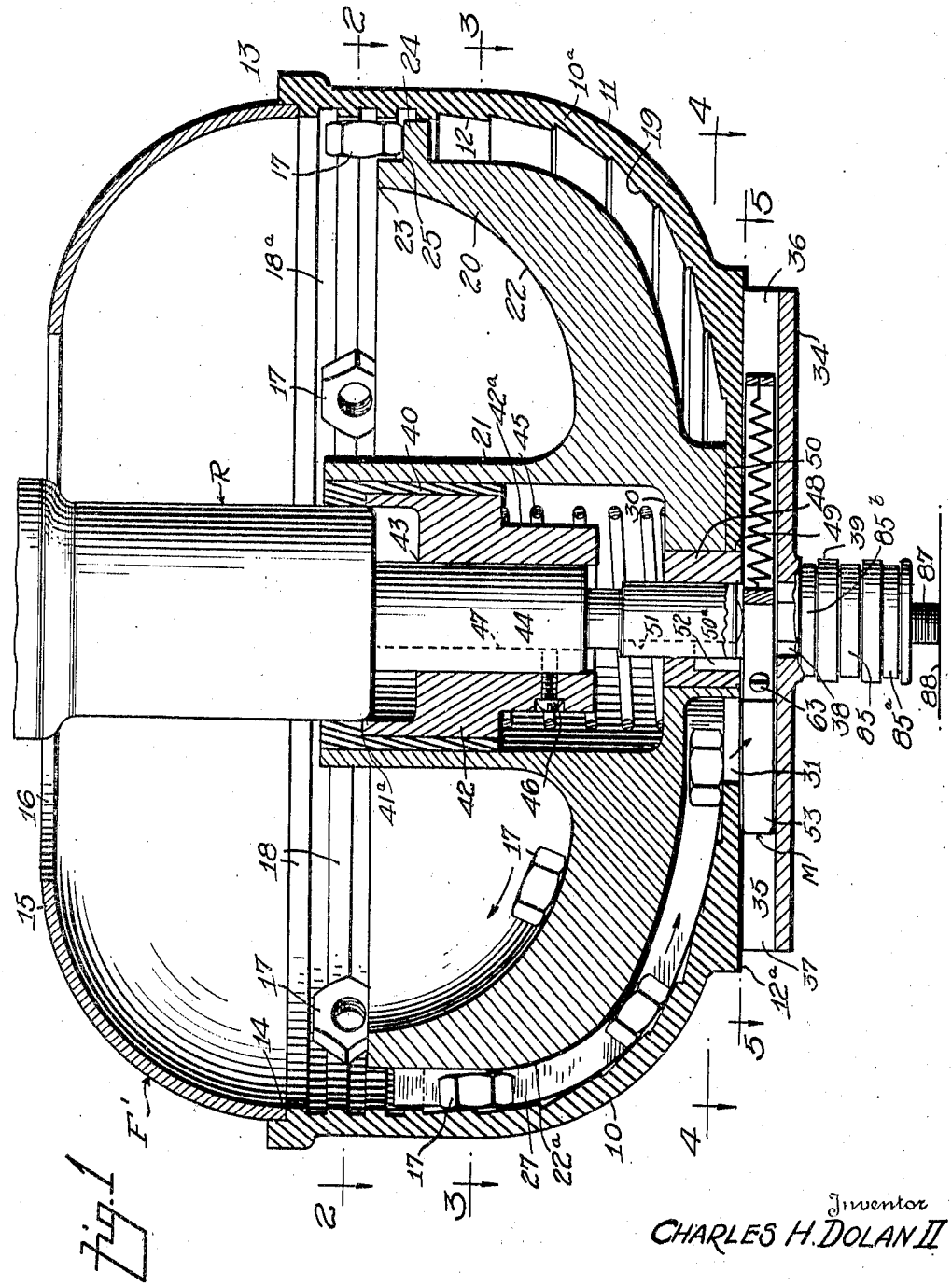

2,349,540

UNITED STATES PATENT OFFICE 2,349,540

AUTOMATIC FEEDER

Charles H. Dolan, II, Kansas City, Mo.

Application June 28, 1943, Serial No. 492,628

7 Claims. (Cl. 10—170)

The instant invention relates to an automatic feeder for nuts, screws, bolts and the like, and more particularly to such a feeder that may be attached to a standard power screw or nut driver or the like.

One of the primary objects of the invention is the provision of a feeder of the type specified in which centrifugal force of the intermittently rotating feeder is utilized to feed nuts, screws, and the like from a hopper to a stacking wall, and inertia and gravity employed to direct the nuts, screws or the like through a chute in position to be singly and intermittently attached to the work.

Yet another aim is the construction of a feeder in which a weighted, spring valve member is centrifugally operated permitting feeding of the nuts or screws intermittently, but singly, in position for attachment by a nut runner or the like to the work.

Still a further purpose is the incorporation in a feeder of a socket having spring means for holding a plurality of nuts, screws, bolts or the like in a manner to inhibit more than a single nut, etc. being attached to the work during a single operation.

Finally, it is an important object of the invention to construct a device of the character indicated which will require but few parts, be efficient in operation and simple of manufacture and in use.

The above and other aims and objects will be apparent from the detailed description hereinafter appearing when taken in conjunction with the appended drawings showing the invention applied to a nut runner and in which Fig. 1 is a vertical sectional view through the automatic feeder;

Fig. 2 is a sectional view on a reduced scale taken on line 2—2 of Fig. 1;

Fig. 3 is a sectional view on a reduced scale taken on line 3—3 of Fig. 1;

Fig. 4 is a sectional view on a reduced scale taken on line 4—4 of Fig. 1;

Fig. 5 is a sectional view on an enlarged scale taken on line 5—5 of Fig. 1;

Fig. 6 is a horizontal sectional view on an enlarged scale of the nut-holding socket showing spring-pressed ball means for holding the nuts;

Fig. 7 is a fragmentary vertical sectional view of the socket shown in Fig. 6;

Fig. 8 is a sectional view taken on line 8—8 of Fig. 5;

Fig. 9 is a sectional view taken on line 9—9 of Fig. 5;

Fig. 10 is a plan view of the weighted spring centrifugally-operated valve member.

Figure 11:
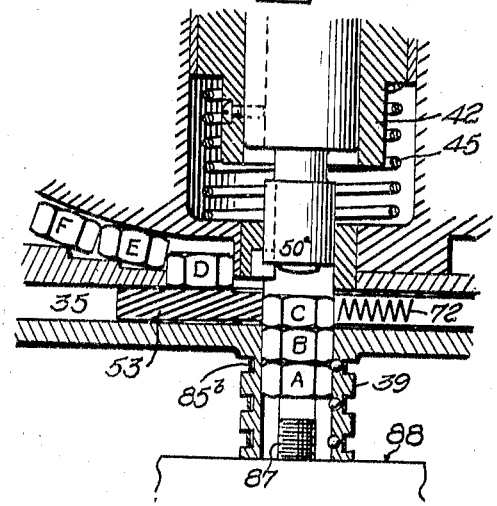
Figs. 11, 12, 13 and 14 are views partly in section showing in progression the manner in which the nuts are fed through the nut-holding socket and singly attached in a continuous manner to a threaded stud on the work.

Referring now to the drawings by reference characters, F' designates the automatic feeder as a whole and which comprises as one of its features an intermittently rotatable, annular, hollow housing or the like 10 having a wall 10a the external surface of which is designated as 11, the internal surface 12 and the bottom or base of the housing 10 identified as 12a. The upper edge or rim 13 of the housing 10 is provided with an internal annular seat 14 frictionally supporting a convex cover 15, the latter being centrally apertured as at 16 forming an opening of appreciable size for the insertion of nuts 17 within the housing for storage. The internal surface 12 of the housing 10 adjacent rim 13 is characterized by a series of spaced internally projecting annular bands 18 forming a corrugated stacking wall 18a, while the lower portion of the inclined surface 12 has a series of stepped angular corrugations 19, all for the purposes to be fully set out hereinafter.

A bowl or hopper 20 having an upright centrally located boss 21, is mounted in and secured to housing 10 for intermittent rotation therewith, said hopper having a smooth upper inclined surface 22 constituting a support or storage for the nuts 17 when same are inserted through opening 16 in housing cover 15. Hopper 20 adjacent its upper edge 23 but slightly therebelow has a structurally integral outwardly extending annular flange 24 projecting in proximity to internal wall 12 of housing 10. The construction just described constitutes a race 25 for receiving the nuts when the latter are moved upwardly and outwardly by centrifugal force, the stacking wall 18a serving to direct the nuts around the race 25 which has a stop 25a and is imperforate but for an opening 26 large enough to permit a single nut at any one time to drop therethrough—see Fig. 2. Opening 26 leads to an enclosed chute 27 defined by spaced side walls 28 and 29, see Fig. 3. These walls are structurally integral with an enlarged apertured hub 30 which is integral with and constitutes the base for boss 21 of bowl 20—see Fig. 4. The walls 28 and 29 follow the contour of inclined internal surface 12 of housing 10, so that said walls, the surface 12 and external surface 22a of bowl or hopper 20 form enclosed chute 27, which as indicated has an entrance opening 26 and also an exit opening 31 in base 12ª of the housing. It will now be apparent that intermittent rotation of housing 10 and its bowl 20 in a manner to be hereinafter indicated will cause nuts 17 to be thrown by centrifugal force upwardly and outwardly over inclined surface 22 of bowl 20 against stacking wall 18ª into race 25. Here the inertia of starting and stopping during intermittent rotations rolls nuts 17 around the race 25 between the upper rim 23 of the hopper or bowl 20 and the stacking wall 18ª, the corrugation bands 18 of the latter acting to minimize friction as nuts 17 roll into place for entry one at a time through aperture 26 into chute 27, the angled or stepped corrugations 19 serving to prevent the nuts which have once entered the chute 27 from riding upwardly under the influence of centrifugal force.

Base 12ª of housing 10 has a pair of spaced downwardly depending short vertical side walls 32 and 33—see Figs. 5, 8 and 9—and a horizontal bottom wall 34 connecting said side walls, said walls 32, 33 and 34 being preferably co-extensive in length with base 12ª to form hollow guideway 35 open at its opposed ends as at 36 and 37, said bottom wall having a central hexagonal aperture 38 leading to a cylindrical socket member 39 integral with said bottom wall. The top of the guide-way is defined by the apertured base 12ª of the housing.

Referring to Fig. 1 the reference character R designates an electric nut runner to which rotary movements may be imparted in a manner forming no part of the instant invention. As shown the nut runner R projects into housing 10 through opening 16 in cover 15. To operatively seat the runner, boss 21 has a bushing 40 partially projecting thereinto and frictionally fitted therein and secured thereto by set screws 41 or the like—see Fig. 2. Bushing 40 includes an internal annular flange 41ª adjacent its upper edge or rim, said flange constituting means for limiting upward movement of an annular stop member 42 centrally apertured at 43, through which aperture reduced intermediate portion 44 of nut runner R slidably passes. As shown the lower reduced portion 42a of stop member 42 extends within upper portion of a coil spring 45 the lower portion of said spring being seated on hub 30 of bowl 20. To inhibit relative movement between the nut runner R and stop member 42 the reduced portion 42ª of said member is provided with a screw or the like 46 having a smooth shank portion freely riding in an elongated vertical slot 47 in intermediate section 44 of said runner. A collar member 48 is tightly fitted within the aperture in hub 30 so as to constitute a fixed connection between said collar and bowl 20, said collar being further attached in any appropriate manner as at 49 to base 12ª of housing 10 and said bowl to the latter as at 50, so that said collar, housing and bowl will rotate as a unit. The lowermost portion 50a of nut runner R is vertically slotted to form a keyway as at 51 to slidably receive a key 52 fixed in collar 48. From the preceding description it will now be seen that rotation of the nut runner will impart rotation to the housing and bowl the connection being through key 52 of collar 48. Furthermore, axial movement of the nut runner will be possible by virtue of slots 47 and 51 in the runner, and screw 46 and key 52 in the stop member 42 and collar 48, respectively. Downward movement of the runner will result in contact of the enlarged portion of the runner with stop member 42 and consequent compression of spring 45 to cushion the action of the runner.

Referring to Fig. 5, a centrifugally-operated weighted spring valve member M is mounted in hollow guideway 35, said valve member comprising a rectangular weight 53 having a narrow extension 54 extending from its inner face 55, said extension including angularly disposed faces 56 and 57 defining the inner side thereof. A pair of elongated spaced arms 58 and 59 are secured to the opposed sides 60 and 61 of extension 54 as by screws or the like 62 and 63. The ends 64 and 65 of arms 58 and 59 respectively, are bent at right angles as at 66 and 67 to project in opposite directions. Collar member 48 has a pair of spaced downwardly directed supporting fingers 68 and 69 projecting within guideway 35, said fingers each having a lug 70 or 71 fixed thereto. A pair of similar springs 72 and 73 each have one terminal portion thereof secured to one of said lugs forming a spring attached to either inturned ends 66, 67 of arms 58 and 59. Each spring is equipped with a limiting wire or cord 74 or 75. Rotation of the feeder will result in moving the weight 53 outwardly or to the left as viewed in Fig. 5 with consequent compression of springs 72 and 73, the lugs 70 and 71 acting as fixed seats for the springs and the fingers 68 and 69 as guides for arms 58 and 59. When the weight has moved outwardly under the influence of centrifugal force a nut 17 will be able to drop through exit opening 31 into guide-way 35 and when rotation of the feeder is stopped the compressed springs will return weighted member 53 to its inactive position, the angular faces 56 and 57 of extension 54 meanwhile contacting similar faces on the nut so that the latter is guided into position beneath nut runner R.

Socket member 39, as shown in Fig. 6, has an axial hexagonal opening 76 therein, the wall 78 of said socket member being cut away at spaced points forming seats 79, 80 and 81 for balls 82, 83 and 84, said seats being all in one plane. It will be seen that each ball projects slightly into opening 76 and that all the balls are held in place by a split spring ring 85 seated in an annular groove 86 in wall 78 of socket member 39, said ring being in the same plane with said ball seats and in contact with the external surface of the balls 82, 83 and 84 to force same inwardly into operative position. There is provided a second and lower set of seats 79ª, 80ª and 81ª for balls 82ª, 83ª and 84ª, a split ring 85ª and an annular groove 86ª, all in the same plane, and similar in every respect with the first set of spring pressed balls described above. A third and similar upper set of balls, seats and ring 85ᵇ is also provided.

Figs. 11, 12, 13 and 14 illustrate the successive steps in the operation and use of the unit F'. The operator picks up the unit and carries it to the stationary work 88 arranging the runner thereon with the threaded stud 87 of the work projecting into the socket 39, as shown in Fig. 11.

Figure 12:
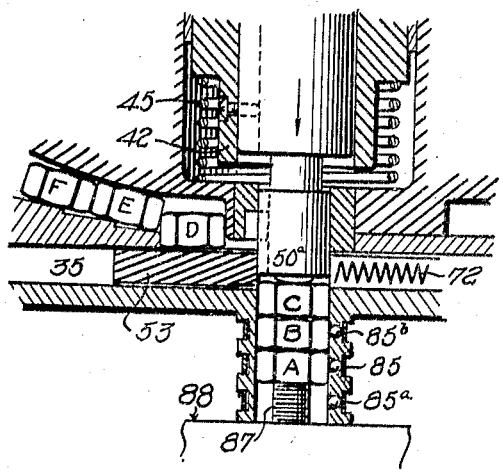

In the next step the operator moves the nut runner R axially and downwardly against tension of spring 45 causing the lowermost portion 50ª of the runner to contact nut C and move nuts A, B and C from the position shown in Fig. 11 to that of Fig. 12 in which nut A is shown in contact with stud 87 to be threaded thereon.

Figure 13:
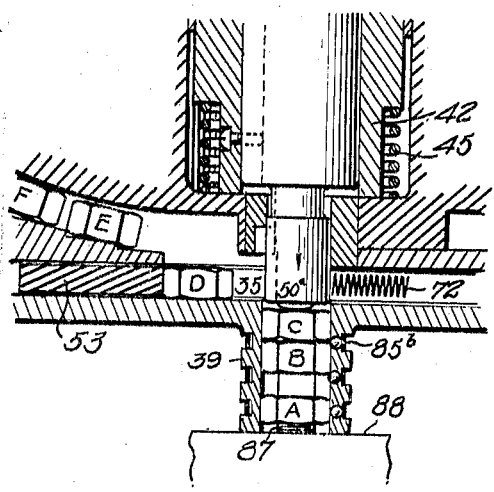

Rotation of the unit now threads nut A on stud 87 and the centrifugal force created by the rotation of the unit moves weight 54 of valve M outwardly or to the left as seen in Fig. 13. This action compresses spring 72 and permits nut D to enter opened guideway 35. The downward movement of nut runner portion 50a has been halted by stop member 42 with maximum operative compression of spring 45. Nut B remains held in place by the balls associated with spring 85 high enough to inhibit any possibility of it being threaded on the stud 87.

Figure 14:
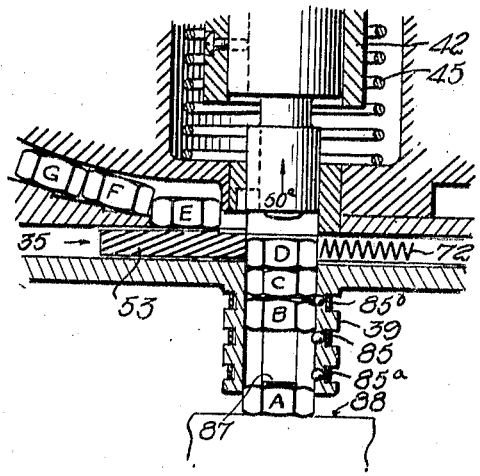

Fig. 14 shows that nut A has now been threaded onto the work due to rotation of the unit which has now come to a stop. Spring 72 has pulled weight 54 back to its original position and in so doing has moved nut D, which has previously entered the valve, into position to be admitted to socket 39 preparatory to a repetition of the operation.

It will now be apparent that there has been produced an automatic feeder well adapted to perform its intended functions. Various changes may be made in the embodiment illustrated as will be understood by those skilled in the art to which this invention appertains. It is contemplated to cover all such changes and to be limited in this respect only as may be necessary by the scope of the claims hereto appended.

What I claim and desire to secure by Letters Patent is:

1. A feeder for nuts and the like comprising a housing, a hopper for the nuts within the housing, said hopper having a raceway and a chute leading from said raceway, means for rotating said housing and hopper as a unit to feed the nuts by centrifugal force from the hopper to the raceway and by gravity down the chute, means at the exit portion of the chute releasing the nuts intermittently but singly, and means passing axially through the hopper for feeding the released nuts into position for attachment.

2. A feeder for nuts and the like comprising a housing, a hopper for the nuts within the housing, said hopper having a raceway and a chute leading from said raceway, means for rotating said housing and hopper as a unit to feed the nuts by centrifugal force from the hopper to the raceway and by gravity down the chute, a valve at the exit portion of the chute releasing the nuts intermittently but singly, and means passing axially through the hopper for feeding the released nuts into position for attachment.

3. A feeder for nuts and the like comprising a housing, a hopper for the nuts within the housing, said hopper having a raceway and a chute leading from said raceway, means for rotating said housing and hopper as a unit to feed the nuts by centrifugal force from the hopper to the raceway and by gravity down the chute, a spring-actuated weighted valve member operable by centrifugal force at the exit portion of the chute releasing the nuts intermittently but singly, and means passing axially through the hopper for feeding the released nuts into position for attachment.

4. A feeder for nuts and the like comprising a housing having an interior corrugated stacking wall adjacent the upper portion thereof, a hopper for the nuts within the housing, said hopper having a raceway adjacent said wall and a chute leading from said raceway, said chute having a stepped bottom surface, means for rotating said housing and hopper as a unit to feed the nuts by centrifugal force from the hopper to the raceway with the aid of said stacking wall and by gravity down the chute, said stepped bottom countering the action of centrifugal force on the nuts in the chute, means at the exit portion of the chute releasing the nuts intermittently but singly, and means for feeding the released nuts into position for attachment.

5. A feeder for nuts and the like comprising a housing, a hopper for the nuts within the housing, said hopper having a raceway and a chute leading from said raceway, means for rotating said housing and hopper as a unit to feed the nuts by centrifugal force from the hopper to the raceway and by gravity down the chute, means at the exit portion of the chute releasing the nuts intermittently but singly, said housing having a socket, spring-pressed ball means within said socket, said ball means holding the released nuts in position for attachment.

6. A feeder for nuts and the like comprising a housing, a hopper for the nuts within the housing, said hopper having a raceway and a chute leading from said raceway, means for rotating said housing and hopper as a unit to feed the nuts by centrifugal force from the hopper to the raceway and by gravity down the chute, means at the exit portion of the chute releasing the nuts intermittently but singly, said housing having a socket, the wall of said socket having a plurality of spaced seats in the same plane extending therethrough, a ball within each of said seats, a split spring ring exteriorly of the socket embracing said balls, said spring-pressed ball means holding the released nuts in position for attachment.

7. A feeder for nuts and the like comprising a housing having an interior corrugated stacking wall adjacent the upper portion thereof, a hopper for the nuts within the housing, said hopper having a raceway adjacent said wall and a chute leading from said raceway, said chute having a stepped bottom surface, means for rotating said housing and hopper as a unit to feed nuts by centrifugal force from the hopper to the raceway with the aid of said stacking wall and by gravity down the chute, said stepped bottom countering the action of centrifugal force on the nuts in the chute, a spring-actuated weighted valve member operable by centrifugal force at the exit portion of the chute releasing the nuts intermittently but singly, said housing having a socket, spring-pressed ball means within said socket, said ball means holding the released nuts in position for attachment.

CHARLES H. DOLAN, II.